United States Patent [19]

Watanabe

[11] Patent Number: 5,093,140
[45] Date of Patent: Mar. 3, 1992

[54] AQUEOUS BACTERICIDE FOR ANIMAL TREATMENT

[75] Inventor: Akinobu Watanabe, Saitama, Japan

[73] Assignees: Eisai Co., Ltd.; Daicel Chemical Industries, Ltd., both of Tokyo, Japan

[21] Appl. No.: 434,681

[22] PCT Filed: Apr. 27, 1989

[86] PCT No.: PCT/JP89/00448
§ 371 Date: Oct. 27, 1989
§ 102(e) Date: Oct. 27, 1989

[30] Foreign Application Priority Data

Jul. 20, 1988 [JP] Japan .................. 63-180666

[51] Int. Cl.⁵ ............................................ A23L 1/31
[52] U.S. Cl. ............................ 426/326; 426/332; 426/335; 452/74; 134/25.3
[58] Field of Search ............ 426/326, 332, 310, 335, 426/532, 542, 642, 68, 644; 134/25.3; 452/74, 75, 173, 76, 77, 78, 79, 80

[56] References Cited

U.S. PATENT DOCUMENTS

| | | | |
|---|---|---|---|
| Re. 31,779 | 12/1984 | Alliger | 424/665 |
| 3,276,881 | 10/1966 | Troller | 426/532 |
| 3,406,081 | 10/1968 | Bauer | 426/310 |
| 3,831,389 | 8/1974 | Lipone | 426/524 |
| 4,021,585 | 5/1977 | Svoboda | 426/310 |
| 4,207,347 | 6/1980 | D'Atri | 426/310 |
| 4,476,112 | 10/1984 | Aversano | 426/532 |
| 4,683,618 | 8/1987 | O'Brien | 452/173 |
| 4,766,646 | 8/1988 | Parker | 17/51 |
| 4,852,216 | 8/1989 | Clayton | 426/332 |
| 4,862,557 | 9/1989 | Clayton | 452/173 |
| 4,865,855 | 9/1989 | Hansen | 426/124 |
| 4,965,911 | 10/1990 | Davey | 452/173 |
| 4,986,990 | 1/1991 | Davidson | 424/665 |

FOREIGN PATENT DOCUMENTS 51-133304  11/1976  Japan .
57-16682   1/1982   Japan .

OTHER PUBLICATIONS

Chikusan no Kenkyu, vol. 43(7) 831–838, 1989 (translation).
CA 111(23):213522u.

*Primary Examiner*—Carolyn Paden
*Attorney, Agent, or Firm*—Flynn, Thiel, Boutell & Tanis

[57] ABSTRACT

A process for treating animal meat during the steps of scalding and chilling is disclosed. The meat is treated with an aqueous Biocide which contains a mixture of two or more organic acids and a surfactant.

14 Claims, No Drawings

AQUEOUS BACTERICIDE FOR ANIMAL TREATMENT

FIELD OF INDUSTRIAL APPLICATION

This invention relates to an aqueous bactericide which is used in order to keep slaughter plant dressing meat animals to, for example, chicken, turkey, beef or pork, clean and to maintain the qualities of the meat in an excellent condition.

PRIOR ART

Recent increase in the demand for animal proteins has brought about rapid development of the poultry and cattle meat industries. Accordingly, it has been attempted in this field to enlarge and automate a meat treatment plant to thereby increase the yield, improve the qualities and lower the cost. It is very important in such a meat treatment plant to keep the final cattle or poultry meat free from any microbial contamination.

For example, poultry are generally treated in a poultry treatment plant in the following manner: hanging—bleeding—scalding—plucking and dehairing—gutting—washing—chilling—cutting—packing storing.

Prior to plucking and dehairing, the plumage are generally scalded at a temperature of 50° to 60° C. for 30 to 120 sec.

Prior to scalding, various bacteria, including *Escherichia coli*, adhere to the poultry. It is sometimes observed that the poultry are contaminated with bacteria toxic to man, for example, genus Salmonella or genus Campylobacter. After the initiation of scalding, therefore, the bacterial count in the scalding water is increased, which, causes the bacterial contamination of poultry which are less contaminated. In addition, the instruments to be used after the plucking and dehairing stage also become contaminated thereby.

Thus, it is necessary to develop a method for pasteurizing poultry at an early stage of treatment, namely, the scalding stage to thereby minimize contamination in subsequent stages and thus supply safe poultry meat free from any bacterial contamination.

In the United States, this requirement is urgent, and thus a number of methods therefor have been examined [cf., e.g., J. Food. Prot. 49 (7), 500–503 (1986)]. In one such method, a water tank is provided to scald dehaired poultry and bacteria such as genus Salmonella are pasteurized with an aqueous solution of acetic acid. According to this method, however, an additional stage must be added to the existing poultry or cattle treatment process, which brings about some undesirable problems, for example, an increase in the treatment cost caused by increases in the equipment cost and treatment stages.

Furthermore, water is commonly used alone in the washing stage following the gutting stage. However, the poultry are sometimes newly contaminated with bacteria during gutting. Thus there is a fear that the contaminated poultry are supplied as a meat product as such.

DISCLOSURE OF THE INVENTION

The present inventors have studied in order to develop an aqueous bactericide which can impart a bactericidal effect to the scalding water per se widely used in the scalding stage and also is safe as a food additive. As a result, they have succeeded in the achievement of a satisfactory bactericidal effect by using an inexpensive composition.

Furthermore, they have found, though in a preliminary test, that the application of an aqueous bactericide of the same composition as the one described above to the washing liquor to be used in the washing stage following gutting would be effective in obtaining clean products.

Namely, the present invention relates to an aqueous bactericide containing organic acid(s) for animal treatment, which is to be used in the scalding or washing stage in a dressing process for meat collection.

When the aqueous bactericide of the present invention contains one organic acid, said organic acid may be selected from among aliphatic carboxylic acids except acetic acid and aliphatic hydroxy carboxylic acids. For example, it may exclusively contain approximately 0.05% by weight of malic acid or 0.05% by weight of lactic acid.

Furthermore, the aqueous bactericide of the present invention may contain a mixture of two or more organic acids. For example, it may preferably contain malic acid, acetic acid, lactic acid and water at a ratio of 25:30:25:20. The optimum pH value of the aqueous bactericide of the present invention ranges from 4.2 to 4.5.

Further, the aqueous bactericide of the present invention may contain surfactant(s) or sodium hypochlorite besides organic acid(s). Furthermore, it may contain all of the organic acid(s), surfactant(s) and sodium hypochlorite.

The present invention further provides a process for pasteurizing animal meat, which has been dressed for meat collection, by washing said meat with the aqueous bactericide as defined above, in particular, a process for pasteurizing poultry meat by heating said meat and scalding the same in the aqueous bactericide as defined above before dehairing.

The aqueous bactericide of the present invention may be used not only in the scalding stage but also in the chilling stage. Namely, it may be introduced into a chiller or used in another tank after chilling. The meat may be treated in the chiller for 5 to 60 minutes, for example, at pH 4.5 for 10 minutes or at pH 5.5 for 30 minutes. When the aqueous bactericide of the present invention is to be used in another tank, the meat may be treated therein at pH 5 to 5.5 for 30 to 50 seconds.

The embodiment of the present invention in the chilling stage, in particular, in the chiller is advantageous in that the taste of the meat can be improved thereby. A broiler carcass inherently has a characteristic odor. However this odor can be relieved by adding organic acid(s) thereto and this effect can be elevated as the scalding time is prolonged and the amount of the added organic acid(s) is increased. When the concentration of the organic acid(s) exceeds a certain level, said characteristic odor disappears and instead an acidic odor of the organic acid(s) becomes noticeable. The color of the scalded meat becomes vivid as the scalding time is prolonged or as the pH value of the scalding water is lowered when compared with an untreated one. When scalded for 24 hours or more, the meat still remains glossy and scarcely shows any dripping. Furthermore, the odor and taste thereof are obviously superior to those of conventional ones, showing desirable changes.

The aqueous bactericide of the present invention is useful in the dressing of poultry or cattle, for example, in scalding poultry prior to plucking.

As the organic acid to be used in the present invention, aliphatic carboxylic acids and aliphatic hydroxy carboxylic acids are preferable. Appropriate examples thereof include acetic, propionic, lactic, citric, tartaric, gluconic and malic acids. Furthermore, salts of these acids are also available. Among these materials, acetic, lactic and malic acids, each authorized for use as a food additive, are preferable from the viewpoints of economics, bactericidal effect and safety.

Examples of the surfactant to be used in the present invention include glycerol fatty acid esters, sorbitan fatty acid esters, sucrose fatty acid esters and propylene glycol fatty acid esters. Among these materials, sucrose fatty acid esters having a high HLB value authorized as a food additive are preferable from the viewpoint of safety.

When an unplucked bird is scalded in the treatment of poultry, the surface tension of the plumage prevents the organic acid(s) from penetrating throughout the body and to the surface of the skin, which makes it impossible to achieve a satisfactory bactericidal effect. However the addition of surfactant(s) enables the organic acid(s) to penetrate throughout the body and to the surface of the skin of the bird within a short period of time. The surfactant(s) may be added in the minimum amount required for achieving the abovementioned effect, from the economic point of view. The surfactant(s) may be generally added in an amount of 0.002 to 0.1% (by weight, the same will apply hereinafter), preferably 0.005 to 0.1%, though it may vary depending on the surfactant(s) to be used.

The organic acid(s) may be added in the minimum amount required for achieving a sufficient effect. Although a larger amount of the organic acid(s) may be added, it would elevate the treatment cost and, sometimes, deteriorate the taste of the meat. The organic acid(s) may be generally added in an amount of 0.01 to 0.1%, preferably approximately 0.1%.

The bactericidal effect of the treating solution containing the organic acid(s) would increase with a decrease in the pH value of the same. However an excessively low pH value might exert undesirable effects on the taste of the meat. It is preferable, therefore, to control the pH value of the treating solution within a range of 3.0 to 5.0, still preferably 4.0 to 4.6.

When introduced into a scalding tank wherein unplucked birds are treated, the aqueous bactericide of the present invention shows a sufficient bactericidal effect on genus Salmonella, genus Campylobacter and *Escherichia coli* adherent to the birds.

The application of the aqueous bactericide of the present invention to the treatment of cattle and poultry meats in a slaughter plant enables the production of safe cattle and poultry meats free from contamination with any bacterium, from the viewpoint of food sanitation.

EXAMPLES

To further illustrate the present invention, and not by way of limitation, the following Examples will be given.

EXAMPLE 1

Acetic and lactic acids were added to hot water in a scalding tank in a poultry slaughter plant to thereby give a liquid composition having a pH value of 4.47. The total acid concentration of the obtained liquid composition was 0.1%. To the liquid composition was added a surfactant DK-Ester F140 (mfd. by Dai-ichi Kogyo Seiyaku Co., Ltd.) to thereby give a desired concentration.

50 μl of the liquid composition thus obtained was placed on the plumage (about 8 to 9 cm in length) of a broiler to thereby form spheres. Then the time required until the spheres were broken and the liquid composition began to penetrate into the plumage was measured.

When 0.001% of the surfactant was added, the obtained result did not differ from the one observed in a control case wherein no surfactant was added. When the amount of the added surfactant exceeded 0.01%, however, the liquid composition (pH 4.47) sufficiently penetrated into the plumage within the scalding period.

EXAMPLE 2

0.05% of the surfactant DK-ester F140 was added to the scalding solution (pH 4.47) prepared in the above Example 1 to thereby give another liquid composition. The pH value of this final liquid composition was 4.47.

9.9 ml of the liquid composition thus obtained was introduced into a test tube (18 mm in diameter) and preliminarily maintained at 53° C. Next, 0.1 ml of a $10^5$/ml suspension of E. coli IFO-3301 was added thereto and the obtained mixture was maintained at 53° C. for 60 and 120 seconds. Then 1 ml of the sample was immediately diluted with a Trypto Soy Agar medium and cultured therein at 37° C. for 48 hours to determine the bacterial count.

Separately, 9.9 ml of sterilized distilled water was introduced into a test tube (18 mm in diameter) and maintained at 53° C. Next, 0.1 ml of the same E. coli suspension as the one used above was added thereto and the mixture was maintained at 53° C. for 60 and 120 seconds. Then it was treated in the same manner as the one described above and the bacterial count of the blank thus obtained was determined.

Furthermore, the effect of a 0.05% aqueous solution of the surfactant DK-Ester F140 was evaluated in the same manner as the one described above. Table 1 shows the results.

TABLE 1

| Bactericidal effects of various liquid compositions | | |
|---|---|---|
| | Bacterial count Treatment time | |
| | 60 sec | 120 sec |
| Blank (distilled water) | $3.7 \times 10^3$ | $3.0 \times 10^3$ |
| 0.05% aq. soln. of DK-Ester F140 | $1.8 \times 10^3$ | $3.1 \times 10^3$ |
| Liquid composition | $6.8 \times 10$ | 0 |

Namely, neither the distilled water nor the 0.05% aqueous solution of the DK-Ester F140 showed any bactericidal effect. In contrast thereto, the liquid composition of the present invention showed a remarkable bactericidal effect, and E. coli was exterminated after 120 seconds.

EXAMPLE 3

Bactericidal effects of scalding waters containing various organic acids and surfactant DK-Ester F104 on plumage contaminated with *Salmonella enteritidis*

A scalding water, which had been used in a poultry slaughter plant, was sterilized under elevated pressure and various organic acids and a surfactant DK-Ester F140 were added thereto. Next, the pH value of each scalding solution thus obtained was adjusted to around 4.5. Then the bactericidal effects of these liquid compositions on plumage contaminated with *Salmonella enteritidis* were examined.

Three or four portions of chicken feathers were bundled together with thread. A bouillon medium in which *Salmonella enteritidis* had been cultured for 48 hours was diluted $10^4$-fold with physiological saline. The obtained solution was applied to the bundles prepared above, which were then dried at room temperature for three days. Thus plumage contaminated with *Salmonella enteritidis* were obtained.

0.03% of the DK-Ester F140 and 0.06% of acetic acid were added to a scalding water of pH 6.95, which had been used in a poultry slaughter plant, to thereby adjust the pH value of the mixture to 4.70. Next, 0.05% of lactic acid or 0.05% of malic acid was added thereto. Thus 200-ml portions of a liquid composition of pH 4.38 and that of pH 4.43 were prepared.

The abovementioned contaminated plumage were scalded in these two liquid compositions maintained at 55° C. Then the number of the *Salmonella enteritidis* cells per ml of each liquid composition were counted and the adhesion of the *Salmonella enteritidis* to the plumage was examined immediately after the scalding and 30, 60, 90 and 120 seconds thereafter. The adhesion of the *Salmonella enteritidis* to the plumage was examined by treating the plumage with physiological saline solution, adding said solution to an agar medium and examined whether any colonies were formed or not. Table 2 shows the results.

TABLE 2

Bactericidal effects of liquid compositions prepared by adding various organic acids and DK-Ester F140 to scalding water (55° C., *Salmonella enteritidis*)

| Liquid composition Formation | pH | Bactericidal effect after | | | | |
|---|---|---|---|---|---|---|
| | | 0 sec | 30 sec | 60 sec | 90 sec | 120 sec |
| | | upper row: bacterial count per ml lower row: adhesion to plumage | | | | |
| scalding water (200 ml) + acetic acid (0.06%) + lactic acid (0.05%) + DK-Ester F140 (0.03%) | 4.38 | 0 + | 0 − | 0 − | 0 − | 0 − |
| scalding water (200 ml) + acetic acid (0.06%) + malic acid (0.05%) + DK-Ester F140 (0.03%) | 4.43 | 0 + | 0 + | 0 + | 0 − | 0 − |
| scalding water (200 ml) + DK-Ester F140 (0.03%) | 6.71 | 4 + | 0 + | 0 + | 0 + | 0 + |

Namely, the bacterial count in each liquid composition was 0, suggesting the bactericidal effect of the same. Furthermore, each liquid composition showed a bactericidal effect on the adhesion of the *Salmonella enteritidis* to the plumage after scalding the plumage therein for 30 or 90 seconds.

COMPARATIVE EXAMPLE 1

Bactericidal effects of scalding water containing various organic acids on plumage contaminated with *Salmonella enteritidis*

This test was conducted different from Example 3 only in that organic acids were exclusively added to the scalding water. The amounts of the added acetic, lactic and malic acids were the same as those described in Example 3. Thus 200-ml portions of liquid compositions were prepared. Contaminated plumage were prepared in the same manner as the one described in Example 3 and the bactericidal effect of each liquid composition obtained above thereon was evaluated. Table 3 shows the results.

TABLE 3

Bactericidal effects of liquid compositions prepared by adding various organic acids to scalding water (55° C., *Salmonella enteritidis*)

| Liquid composition Formation | pH | Bactericidal effect after | | | | |
|---|---|---|---|---|---|---|
| | | 0 sec | 30 sec | 60 sec | 90 sec | 120 sec |
| | | upper row: bacterial count per ml lower row: adhesion to plumage | | | | |
| scalding water (200 ml) + acetic acid (0.06%) + lactic acid (0.05%) | 4.50 | 0 + | 0 + | 2 + | 0 + | 0 − |
| scalding water (200 ml) + acetic acid (0.06%) + malic acid (0.05%) | 4.50 | 3 + | 0 + | 2 + | 0 + | 0 + |
| scalding water (200 ml) (control) | 6.75 | 720 + | 5 + | 2 + | 0 + | 0 + |

Namely, the bacterial counts in the test lots were smaller than that in the control one, which suggests the bactericidal effects of the liquid compositions. The bactericidal effect of each liquid composition on the adhesion of the bacterium to the plumage was observed after scalding the plumage therein for 120 seconds, though it required a longer period of time than those prepared in Example 3 did (30 and 90 seconds).

EXAMPLE 4

Bactericidal effects of scalding water containing various organic acids and surfactant DK-Ester F140 on plumage contaminated with *Campylobacter jejuni*

A *Campylobacter jejuni brucella* strain cultured for 48 hours was diluted $10^4$-fold and applied to chicken plumage in the same manner as the one described in Example 3. Thus plumage contaminated with *Campylobacter jejuni* were prepared.

Similar to Example 3, 0.03% of the surfactant DK-Ester F140 was added to the scalding solution followed by 0.06% of acetic acid and 0.05% of lactic acid or 0.05% of malic acid. Thus 200-ml portions of two liquid compositions having pH values of 4.38 and 4.39 were obtained. The bactericidal effects of these two liquid compositions on the plumage contaminated with the *Campylobacter jejuni* were evaluated. Table 4 shows the results.

TABLE 4

Bactericidal effects of liquid compositions prepared by adding various organic acids and DK-Ester F140 to scalding water (55° C., *Campylobacter jejuni*)

| Liquid composition Composition | pH | Bactericidal effect after | | | | |
|---|---|---|---|---|---|---|
| | | 0 sec | 30 sec | 60 sec | 90 sec | 120 sec |
| | | upper row: bacterial count per ml lower row: adhesion to plumage | | | | |
| scalding water (200 ml) + acetic acid (0.06%) + lactic acid (0.05%) + DK-Ester F140 (0.03%) | 4.38 | 3 + | 0 + | 0 + | 0 − | 0 − |
| scalding water (200 ml) + acetic acid (0.06%) + | 4.39 | 0 + | 0 − | 0 − | 0 − | 0 − |

TABLE 4-continued

Bactericidal effects of liquid compositions
prepared by adding various organic acids
and DK-Ester F140 to scalding water
(55° C., *Campylobacter jejuni*)

| Liquid composition | | Bactericidal effect after | | | | |
|---|---|---|---|---|---|---|
| | | 0 sec | 30 sec | 60 sec | 90 sec | 120 sec |
| | | upper row: bacterial count per ml | | | | |
| Composition | pH | lower row: adhesion to plumage | | | | |
| malic acid (0.05%) + DK-Ester F140 (0.03%) scalding water (200 ml) + DK-Ester F140 (0.03%) | 6.71 | 188 + | 35 + | 1 + | 0 + | 0 + |

Namely, the bacterial counts of the test lots were smaller than that in the control lot wherein no organic acid was added, which suggests the bactericidal effect of each liquid composition. Furthermore, each liquid composition showed a bactericidal effect on the adhesion of the bacterium to the plumage after scalding the plumage therein for 30 or 90 seconds.

COMPARATIVE EXAMPLE 2

Bactericidal effects of scalding water containing various organic acids on plumage contaminated with *Campylobacter jejuni*

This test was conducted different from Example 4, only in that organic acids were exclusively added to the scalding water. The amounts of the added acetic, lactic and malic acids were the same as those described in Example 4. Thus 200-ml portions of two liquid compositions were prepared. Plumage contaminated with *Campylobacter jejuni* were prepared in the same manner as described in Example 4 and the bactericidal effect of each liquid composition obtained above was evaluated. Table 5 shows the results.

TABLE 5

Bactericidal effects of liquid compositions
prepared by adding various organic acids to
soaking water (55° C., *Campylobacter jejuni*)

| Liquid composition | | Bactericidal effect after | | | | |
|---|---|---|---|---|---|---|
| | | 0 sec | 30 sec | 60 sec | 90 sec | 120 sec |
| | | upper row: bacterial count per ml | | | | |
| Formulation | pH | lower row: adhesion to plumage | | | | |
| scalding water (200 ml) + acetic acid (0.06%) + lactic acid (0.05%) | 4.55 | 0 + | 0 + | 2 + | 0 + | 0 − |
| scalding water (200 ml) + acetic acid (0.06%) + malic acid (0.05%) | 4.58 | 0 + | 0 + | 0 − | 0 + | 0 + |
| scalding water (200 ml) (control) | 6.57 | 6 + | 2 − | 0 + | 0 − | 0 − |

Namely, the bacterial counts in the liquid compositions were smaller than that in the control lot wherein scalding water was used alone, which suggests the bactericidal effects of the liquid compositions. However, none of the liquid compositions showed a sufficient bactericidal effect on the bacterium adherent to the plumage.

The comparison of the results of Example 3 with those of Comparative Example 1 and the comparison of the results of Example 4 with those of Comparative Example 2 indicate that the bactericidal effect of the organic acids on the plumage contaminated with bacteria can be exerted within a short period of time and enhanced by adding the surfactant DK-Ester F140. This phenomenon was brought about by an increase in the permeability of the liquid composition caused by the addition of the surfactant, as shown by the results of Example 2.

EXAMPLE 5

4300 l of underground water was fed into a 5-m$^3$ stainless scalding tank in a cattle and poultry slaughter plant. Next, 1.29 kg of a surfactant DK-Ester F140 (mfd. by Dai-ichi Kogyo Seiyaku Co., Ltd.) was added and dissolved therein by stirring. Separately, 3 kg of acetic acid, 2.8 kg of 90% DL-lactic acid and 2.5 kg of DL-malic acid were added together to 1.7 kg of water and homogeneously dissolved therein. 7.57 l of the solution thus obtained was introduced into the above-mentioned scalding tank and homogeneously stirred. The pH of the scalding tank was 4.2. Then the scalding solution was maintained at 60° C. and a bled chicken carcass was scalded therein for 60 minutes. After the scalding, the carcass was plucked and a portion (5 cm×5 cm) on the breast surface thereof was thoroughly wiped with a piece of sterilized gauze (10 cm×10 cm). Next, the breast surface (5 cm×5 cm) of the gutted carcass was similarly thoroughly wiped with a piece of sterilized gauze. After washing, the carcass was treated in the same manner as that described above. Then 1000 l of underground water was fed into a stainless chiller (1200 l) and cooled to 5° C. 840 ml of 12% sodium hypochlorite was added thereto. The pH of the tank was 9.18. Separately, 30 g of acetic acid, 27.8 g of DL-lactic acid and 25 g of DL-malic acid were added together to 17.2 g of water and homogeneously dissolved therein. 50 ml of the solution thus obtained was introduced into the above chiller and stirred. The pH of the tank was 5.0. A gutted chicken carcass was scalded in the solution for one minute and then the breast surface thereof (5 cm×5 cm) was thoroughly wiped with a piece of sterilized gauze (10 cm×10 cm). The gauze was shaken in a 100-ml Erlenmeyer flask containing 100 ml of sterilized physiological saline solution to thereby extract the bacteria adherent to the gauze. The extract was diluted with a Trypto Soy Agar medium and cultured therein at 37° C. for 48 hours to determine the general bacterial count. Table 6 shows the results.

TABLE 6

Bactericidal effects of aqueous
solution of sodium hypochlorite, acetic
acid, lactic acid and malic acid
fed into chiller

| | General bacterial count[*1] |
|---|---|
| Before scalding[*2] | $4.8 \times 10^6$ |
| After scalding | $3.4 \times 10^3$ |
| After gutting | $5.3 \times 10^5$ |
| After washing | $4.3 \times 10^4$ |
| After chilling and washing | 0 |

Note:
[*1] No. of bacteria per cm$^2$ of the breast surface of carcass.
[*2] bled carcass was plucked and its breast surface (5 cm × 5 cm) was wiped with sterilized gauze (10 cm × 10 cm) followed by extraction of the bacteria adherent to the gauze.

COMPARATIVE EXAMPLE 3

The scalding was conducted in the same manner as described in Example 5. Next, 840 ml of 12% sodium hypochlorite alone was added to 1000 l of underground water in a chiller cooled to 5° C. The pH value of the chiller was 9.18. Under these conditions, a chicken carcass was treated in the same manner as described in Example 5 and the general bacterial count on the surface of the carcass was determined at each step of the treatment. Table 7 shows the results.

TABLE 7

| Bactericidal effects of aqueous solution of sodium hypochlorite fed into chiller | |
|---|---|
| | General bacterial count*1 |
| Before scalding*2 | $2.3 \times 10^6$ |
| After scalding | $1.2 \times 10^3$ |
| After gutting | $1.0 \times 10^5$ |
| After washing | $3.8 \times 10^4$ |
| After chilling and washing | $4.5 \times 10^2$ |

Note:
*1 No. of bacteria per cm² of the breast surface of carcass.
*2 bled carcass was plucked and its breast surface (5 cm × 5 cm) was wiped with sterilized gauze (10 cm × 10 cm) followed by extraction of the bacteria adherent to the gauze.

COMPARATIVE EXAMPLE 4

The scalding was conducted in the same manner as described in Example 5. Next, 30 g of acetic acid, 27.8 g of 90% DL-lactic acid and 25 g of DL-malic acid were added together to 17.2 g of water and homogeneously dissolved therein. 50 ml of the solution thus obtained was added to 1000 l of underground water in a chiller cooled to 5° C. The pH value of the chiller was 2.80. Under these conditions, a chicken carcass was treated in the same manner as described in Example 5 and the general bacterial count on the surface of the carcass was determined at each step of the treatment. Table 8 shows the results.

TABLE 8

| Bactericidal effects of aqueous solution of acetic acid, lactic acid and malic acid fed into chiller | |
|---|---|
| | General bacterial count*1 |
| Before scalding*2 | $1.4 \times 10^6$ |
| After scalding | $2.0 \times 10^3$ |
| After gutting | $3.4 \times 10^5$ |
| After washing | $6.2 \times 10^4$ |
| After chilling and washing | $5.8 \times 10^3$ |

Note:
*1 No. of bacteria per cm² of the breast surface of carcass.
*2 bled carcass was plucked and its breast surface (5 cm × 5 cm) was wiped with sterilized gauze (10 cm × 10 cm) followed by extraction of the bacteria adherent to the gauze.

What is claimed is:

1. In a process for processing an animal meat comprising the steps of scalding and chilling said animal meat, the improvement comprising contacting said animal meat with an aqueous bactericide comprising a mixture of two or more organic acids and a surfactant during both of said scalding and chilling steps.

2. A process as claimed in claim 1, in which said mixture of two or more organic acids consists essentially of acetic acid and at least one acid selected from the group consisting of malic acid and lactic acid.

3. A process as claimed in claim 1, wherein said surfactant is selected from the group consisting of glycerol fatty acid esters, sorbitan fatty acid esters, sucrose fatty acid esters and propylene glycol fatty acid esters.

4. A process as claimed in claim 1, wherein said organic acids are selected from the group consisting of acetic acid, propionic acid, lactic acid, citric acid, tartaric acid, gluconic acid and malic acid.

5. In a process for processing an animal meat comprising the steps of scalding and chilling said animal meat, the improvement comprising contacting said animal meat with an aqueous bactericide a mixture of two or more organic acids, a surfactant and sodium hypochlorite during both of said scalding and chilling steps.

6. A process as claimed in claim 5, in which said two or more organic acids are selected from the group consisting of acetic acid, propionic acid, lactic acid, citric acid, tartaric acid, gluconic acid and malic acid and said surfactant is selected from the group consisting of glycerol fatty acid esters, sorbitan fatty acid esters, sucrose fatty acid esters and propylene glycol fatty acid esters.

7. A process as claimed in claim 5, in which said aqueous bactericide contains said two or more organic acids in an amount of from 0.01 to 0.1% by weight, said surfactant in an amount of from 0.005 to 0.1% by weight and has a pH of from 3.0 to 5.0.

8. A process as claimed in claim 5, in which said organic acids are acetic acid and lactic acid.

9. A process as claimed in claim 5, in which said organic acids are acetic acid and malic acid.

10. An aqueous bactericide used in the processing of an animal meat, said aqueous biocide comprising a mixture of two or more organic acids, a surfactant and sodium hypochlorite said organic acids, surfactant and sodium hypochlorite being in amounts sufficient to provide an aqueous bacteride.

11. An aqueous bactericide as claimed in claim 10, in which said two or more organic acids are selected from the group consisting of acetic acid, propionic acid, lactic acid, citric acid, tartaric acid, gluconic acid and malic acid and said surfactant is selected from the group consisting of glycerol fatty acid esters, sorbitan fatty acid esters, sucrose fatty acid esters and propylene glycol fatty acid esters.

12. An aqueous bactericide as claimed in claim 10, containing said two or more organic acids in an amount of from 0.01 to 0.1% by weight, said surfactant in an amount of from 0.005 to 0.1% by weight and having a pH of from 3.0 to 5.0.

13. An aqueous bactericide as claimed in claim 10, in which said organic acids are acetic acid and lactic acid.

14. An aqueous bactericide as claimed in claim 10, in which said organic acids are acetic acid and malic acid.

* * * * *

UNITED STATES PATENT AND TRADEMARK OFFICE
CERTIFICATE OF CORRECTION

PATENT NO. : 5 093 140

DATED : March 3, 1992

INVENTOR(S) : Akinobu WATANABE

It is certified that error appears in the above-identified patent and that said Letters Patent is hereby corrected as shown below:

Column 10, line 16; after "bactericide" insert
---comprising---.
    line 36; change "biocide" to
---bactericide---.
    line 39; after "hypochlorite" insert Signed and Sealed this Tenth Day of August, 1993

Attest:

MICHAEL K. KIRK

*Attesting Officer*    *Acting Commissioner of Patents and Trademarks*